(12) United States Patent
Bettendorf

(10) Patent No.: US 7,499,936 B2
(45) Date of Patent: Mar. 3, 2009

(54) GENERIC SNMP PROXY

(75) Inventor: Cristian-Victor Bettendorf, Konigsbrunn (DE)

(73) Assignee: Software AG, Darmstadt (DE)

( * ) Notice: Subject to any disclaimer, the term of this patent is extended or adjusted under 35 U.S.C. 154(b) by 478 days.

(21) Appl. No.: 10/640,498

(22) Filed: Aug. 13, 2003

(65) Prior Publication Data

US 2004/0153449 A1 Aug. 5, 2004

(30) Foreign Application Priority Data

Aug. 16, 2002 (EP) ................................. 02018510

(51) Int. Cl.
*G06F 17/00* (2006.01)
(52) U.S. Cl. ...................... 707/102; 707/100; 707/101; 707/103 R
(58) Field of Classification Search ......... 707/100–102, 707/103 R
See application file for complete search history.

(56) References Cited

U.S. PATENT DOCUMENTS

| 5,870,749 | A | | 2/1999 | Adusumilli |
| 5,899,988 | A | * | 5/1999 | Depledge et al. ............... 707/3 |
| 5,949,974 | A | | 9/1999 | Ewing et al. |
| 6,377,993 | B1 | * | 4/2002 | Brandt et al. ............... 709/227 |
| 6,539,422 | B1 | * | 3/2003 | Hunt et al. .................. 709/217 |
| 6,968,341 | B2 | * | 11/2005 | Hand et al. .................. 707/102 |
| 2002/0007422 | A1 | | 1/2002 | Bennett |

FOREIGN PATENT DOCUMENTS

| EP | 0 831 617 A2 | 3/1998 |
| JP | 2000267961 | 9/2000 |
| WO | 00/76228 A1 | 12/2000 |

OTHER PUBLICATIONS

Interaction Transaltion Methods for XML/SNMP Gateway, date 1999.*
European Search Report, EP 02 01 8510, Jan. 30, 2003.
Eckhart Koerner, Design of a Proxy for Managing CMIP Agents via SNMP, Computer Communications, Elsevier Science Publishers BV, Amsterdam, NL, vol. 20, No. 5, Jul. 1, 1997, pp. 349-360.
Subrata Mazumdar et al, "Design of Protocol Independent Management Agent to Support SNMP and CMIP Queries", Integrated Network Management, III Proceedings 3$^{rd}$ International Symposium, Apr. 18-23, 1993, Amsterdam, NL, vol. C12, 1993, pp. 377-388.

* cited by examiner

*Primary Examiner*—Sana Al-Hashemi
(74) *Attorney, Agent, or Firm*—Meyertons Hood Kivlin Kowert & Goetzel, P.C.; Jeffrey C. Hood

(57) ABSTRACT

System and method for providing a manager (1) access to data of an arbitrary managed device (2) by using at least one utility (4) of the managed device (2). The method includes sending a request to a utility (4) of the managed device (2), receiving a response from the managed device (2), and mapping information received with the response into a format applicable for the manager (1). A proxy (3) provides a manager (1) access to data of an arbitrary managed device (2).

21 Claims, 5 Drawing Sheets

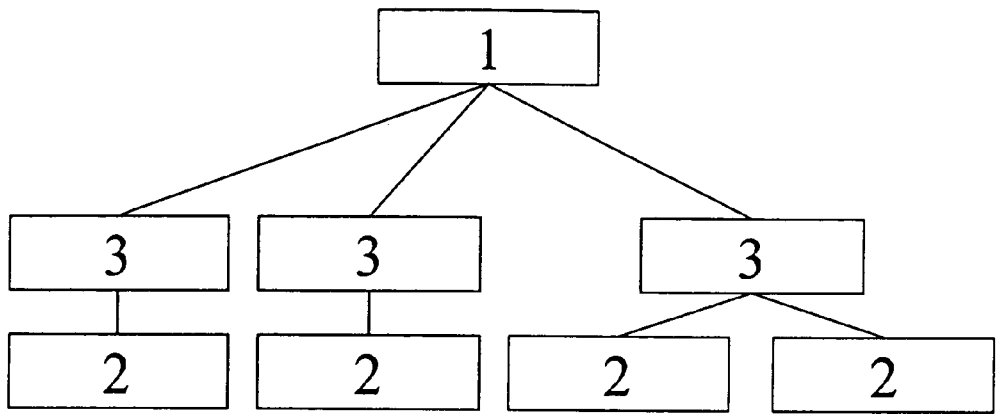

Fig. 1

```
    <row>
 1    <tabitem>DisplayString</tabitem>         <!-- inoDbName -->
 2    <tabitem>1</tabitem>
 3    <tabitem>NOACCESS</tabitem>
 4    <tabitem>YES</tabitem>
 5    <tabitem>-1</tabitem>
 6    <tabitem></tabitem>
 7    <tabitem>1</tabitem>
 8    <tabitem></tabitem>
 9    <tabitem>dblistinov31</tabitem>
10    <tabitem>"object_id=\\aHost\\Tamino\\Databases"</tabitem>
11    <tabitem>0</tabitem>
    </row>
```

Fig. 3

```
<!ENTITY % tabptr      "tabptr      IDREF #IMPLIED">
<!ELEMENT              argus       (fmtversion?,ananame?,anaversion?,structure*)>
<!ELEMENT              fmversion   (#PCDATA)>
<!ELEMENT              ananame     (#PCDATA)>
<!ELEMENT              anaversion  (#PCDATA)>

<!ELEMENT              structure   (table )>
<!ATTLIST              structure   id      ID       #REQUIRED>

<!ELEMENT              table       (header,row+)>
<!ELEMENT              header      (column+)>
<!ELEMENT              column      (name,width)>
<!ELEMENT              row         (tabitem+)>
<!ATTLIST              row         %tabptr;>
<!ELEMENT              name        (#PCDATA)>
<!ELEMENT              width       (#PCDATA)>
<!ELEMENT              tabitem     (#PCDATA)>
```

Fig. 4

```
<row>
 1 <tabitem>MAPVALUE</tabitem>         <!-- 'standby' -->
 2 <tabitem>4</tabitem>
 3 <tabitem>0</tabitem>
 4 <tabitem>tamino/dbstdby</tabitem>
 5 <tabitem>1</tabitem>
 6 <tabitem></tabitem>
 7 <tabitem></tabitem>
 8 <tabitem></tabitem>
 9 <tabitem></tabitem>
10 <tabitem></tabitem>
11 <tabitem></tabitem>
 </row>

<row>
 1 <tabitem>MAPVALUE</tabitem>         <!-- 'inactive' -->
 2 <tabitem>4</tabitem>
 3 <tabitem>0</tabitem>
 4 <tabitem>tamino/dbinact</tabitem>
 5 <tabitem>0</tabitem>
 6 <tabitem></tabitem>
 7 <tabitem></tabitem>
 8 <tabitem></tabitem>
 9 <tabitem></tabitem>
10 <tabitem></tabitem>
11 <tabitem></tabitem>
 </row>

<row>
 1 <tabitem>MAPVALUE</tabitem>         <!-- 'active' -->
 2 <tabitem>4</tabitem>
 3 <tabitem>0</tabitem>
 4 <tabitem>tamino/dbact</tabitem>
 5 <tabitem>2</tabitem>
 6 <tabitem></tabitem>
 7 <tabitem></tabitem>
 8 <tabitem></tabitem>
 9 <tabitem></tabitem>
10 <tabitem></tabitem>
11 <tabitem></tabitem>
 </row>
```

Fig. 5

```
<row>
 1 <tabitem>TRAP</tabitem>             <!-- inoDbStartup -->
 2 <tabitem>1.3.6.1.4.1.1028.3.3.1.3.0.1</tabitem>
 3 <tabitem>N</tabitem>
 4 <tabitem>UP</tabitem>
 5 <tabitem>4</tabitem>
 6 <tabitem>1</tabitem>
 7 <tabitem>{(nth=0)}</tabitem>
 8 <tabitem></tabitem>
 9 <tabitem></tabitem>
10 <tabitem></tabitem>
11 <tabitem></tabitem>
 </row>

<row>
 1 <tabitem>TRAP</tabitem>             <!-- inoDbShutdown -->
 2 <tabitem>1.3.6.1.4.1.1028.3.3.1.3.0.2</tabitem>
 3 <tabitem>N</tabitem>
 4 <tabitem>DOWN</tabitem>
 5 <tabitem>4</tabitem>
 6 <tabitem>1</tabitem>
 7 <tabitem>{(nth=0)}</tabitem>
 8 <tabitem></tabitem>
 9 <tabitem></tabitem>
10 <tabitem></tabitem>
11 <tabitem></tabitem>
 </row>
```

Fig. 6

```xml
<?xml version="1.0" encoding="UTF-8"?>
<argus xmlns="http://namespaces/softwareag.com/schemas/sysman/message.dtd">
<fmtversion>1.2.2.0</fmtversion>
 <structure id="0">
    <table>
              <header>
       ← the header info →
              </header>
      <row>
      1 <tabitem>DisplayString</tabitem>   <!-- inoDbName -->
      2 <tabitem>1</tabitem>
      3 <tabitem>NOACCESS</tabitem>
      4 <tabitem>YES</tabitem>
      5 <tabitem>-1</tabitem>
      6 <tabitem></tabitem>
      7 <tabitem>1</tabitem>
      8 <tabitem></tabitem>
      9 <tabitem>dblistinov31</tabitem>
     10 <tabitem>"object_id=\\aHost\\Tamino\\Databases"</tabitem>
     11 <tabitem>0</tabitem>
      </row>
      <row>
      1 <tabitem>DisplayString</tabitem>   <!-- inoDbDispName -->
      2 <tabitem>2</tabitem>
      3 <tabitem>READONLY</tabitem>
      4 <tabitem>NO</tabitem>
      5 <tabitem>-1</tabitem>
      6 <tabitem></tabitem>
      7 <tabitem>1</tabitem>
      8 <tabitem></tabitem>
      9 <tabitem>dblistinov31</tabitem>
     10 <tabitem>"object_id=\\aHost\\Tamino\\Databases"</tabitem>
     11 <tabitem>0</tabitem>
      </row>
      <row>
      1 <tabitem>DisplayString</tabitem>   <!-- inoDbVersion -->
      2 <tabitem>3</tabitem>
      3 <tabitem>READONLY</tabitem>
      4 <tabitem>NO</tabitem>
      5 <tabitem>-1</tabitem>
      6 <tabitem></tabitem>
      7 <tabitem>2</tabitem>
      8 <tabitem></tabitem>
      9 <tabitem>dblistinov31</tabitem>
     10 <tabitem>"object_id=\\aHost\\Tamino\\Databases"</tabitem>
     11 <tabitem>0</tabitem>
      </row>
      <row>
      1 <tabitem>INTEGER</tabitem>           <!-- inoDbState -->
      2 <tabitem>4</tabitem>
      3 <tabitem>READONLY</tabitem>
      4 <tabitem>NO</tabitem>
      5 <tabitem>-1</tabitem>
      6 <tabitem></tabitem>
      7 <tabitem>0</tabitem>
      8 <tabitem></tabitem>
      9 <tabitem>dblistinov31</tabitem>
     10 <tabitem>"object_id=\\aHost\\Tamino\\Databases"</tabitem>
     11 <tabitem>0</tabitem>
      </row>
    </table>
  </structure>
  <table_oid>1.3.6.1.4.1.1028.3.3.1.2.1</table_oid>
  <update_timeout>45</update_timeout>
  <description>Tamino database state table</description>
  <product>Tamino</product>
  <version>3.1.1.4</version>
</argus>
```

Fig. 7

GENERIC SNMP PROXY

BACKGROUND OF THE INVENTION

PRIORITY CLAIM

This application claims benefit of priority of European application no. 02 018 510.4-2413 titled "Generic SNMP Proxy", filed Aug. 16, 2002, and whose inventor is Cristian-Victor Bettendorf.

1. Field of the Invention

The present invention generally relates to computer systems. More particularly, the present invention relates to enabling communication between components of a computer system.

2. Description of the Related Art

An example of a communication between members of a system is the communication between a so-called manager and a managed device. The task of the manager is to manage the managed device. For this task, the manager needs access to internal data of the managed device. Examples for managed devices are a host, a gateway, a server or an applicant. The managed device and the manager are connected via a suitable connection, for example a network.

In order to provide the manager access to the internal information, vendors of managed devices offer a so-called specific agent for the managed device. The managed device is adapted to communicate with the specific agent and to provide internal information.

If such a specific agent does not exist, the user of the managed device has to create a specific agent on his own. This is a very difficult task since modules have to be developed. For this development knowledge about the internal structure of the managed device is necessary and the structure of the managed device has to be changed, for example in the source code of the managed device.

SUMMARY OF THE INVENTION

In an embodiment, communication is enabled between a manager and an arbitrary managed device, without changing the managed device. In an embodiment, a manager is provided access to data of an arbitrary managed device by using at least one utility of the managed device. In some embodiments, a request may be sent to a utility of the managed device, and a response may be received from the managed device. In some embodiments, information received with the response may be mapped into a format applicable for the manager.

In an embodiment, the communication between an arbitrary managed device and a manager may be enabled. In some embodiments, a unit called proxy may be used. This unit may be realized in software or in hardware. In an embodiment, the proxy is interposed between the manager and the managed device.

In order to enable the communication between the manager and an arbitrary managed device, the manager may contact at least one utility of the managed device.

The term "managed device" may refer to any device that can be managed by a manager in accordance with an embodiment. The managed device may be a hardware or software unit with a specific task or a group of tasks. An example of a managed device is a database. The managed device may have at least one utility. A utility may be a kind of interface, communication protocol, or module that enables the interaction between the managed device and a third party. A utility may be used, for example, to communicate with the managed device in order to query data or a state, to activate or deactivate features, to perform specific actions or to change the configuration.

The utilities may communicate with a third party via different levels. One example for a level is a graphical interface. Another example is a command-line. The TCP/IP protocol may also be an example for a level of a utility.

In some embodiments, the managed device may be connected to a data network. This network may be realized, for example, by cable or radio communication. The manager may also be connected to this data network. The manager may be any software or hardware that monitors or controls and therefore manages the managed device.

In an embodiment, a manager is enabled to get access to an arbitrary managed device. This access may be used by the manager to communicate with the managed device.

Examples for the communication between a manager and a managed device are the transmission of data from the managed device to the manager (get), the transmission of a status message about a status in the managed device to the manager (trap), and the transmission of data from the manager to the managed device (set).

In various embodiments, the communication between the manager and the managed device may include sending a request to at least one utility of the managed device. In an embodiment, the request may include an order to get data of the managed device. The request may be adapted to the functionality of the utility and to the managed device.

In some embodiments, the request may be defined in collection rules. These collection rules may define the act of controlling the managed device by at least one utility. A collection rule may have, for example, a description of the driver that is necessary to contact the desired utility. In addition, the collection rule may have a description of the desired utility of the managed device and dependencies to other collection rules.

In various embodiments, data may be any kind of information about, from, or of the managed device. Examples for different kinds of data may be the status of the managed device, parameters set in the managed device, and statistical information about the operation of the managed device. The term "data" may refer to a specific group of information.

In some embodiments, the managed device may answer with a response. This answer may come from the managed device or the utility, which may belong to the managed device. In an embodiment, this response may include the requested data. But it is also possible that the response includes, for example, an error message or administrative information.

In various embodiments, information may be received with the response and mapped into a format that is applicable for the manager. This information may relate to the response. It can be, for example, the complete response, parts of the response, or information obtained together with the response.

In various embodiments, the data received with the response may be handled in different ways. The response or parts of the response may be translated into an intermediate format. The term "format" is used for a group of rules enabling a communication. Other terms that can be used for this group of rules are, for example, "language", "protocol" and "definitions". The format may be an XML-format.

In some embodiments, the translation of the response, or parts of the response, may be defined in translation rules. The translation rules may define, for example, the structure of the XML-format. The translation rules may have, for example, a link to the relevant collection rule, a definition of the intermediate format, and an XML document building procedure.

If an XML-format is used as an intermediate format, the data may be organized in conceptual tables. Each table may include one or more rows, and each row may have one or more columns. All rows may have the same number of columns. The XML document building procedure may define how the data provided by the respective collection rule is parsed and fill the XML document row by row, each row column by column. The XML intermediate format may be defined in a document type definition (DTD).

In order to obtain the data in a format applicable by the manager, the data in the intermediate format may be mapped into a format applicable for the manager, known as the "manager format". The Simple Network Management Protocol (SNMP) may be one example of such a manager format. This protocol may define a method by which the manager can view or change management information for the managed device. Another example for a manager format is RMON.

In some embodiments, the mapping step may be defined in mapping rules. A mapping rule my have, for example, an object model building procedure, a method to trigger the update of the object model, other linked mapping rules, and the processing of the data to be mapped. This mapping may simply change the format of the data as well as carry out complicated algorithms in order to obtain the necessary value for the manager format.

In various embodiments, the information in a format applicable for the manager may be stored. Thereby, the manager may collect the information from this point on his own. In some embodiments, the information may also be sent to the manager. The information may be preferably sent to the manager in response to a request of the manager. But the information may also be sent regularly. In some embodiments, information may also be sent to the manager, if a certain criteria is fulfilled. In an embodiment, if a certain parameter, for example, falls below a reference value, a corresponding message may be sent to the manager.

The process of getting data from the managed device may be controlled by rules as described above. The rules may define when the corresponding events are carried out. The events may, for example, be initiated by a timer or by another event. The rules may also define what happens with the collected data on the way to the manager format. The data may, for example, be combined by algorithm. In an embodiment, the format of the data may be changed and the data may be evaluated.

In some embodiments, the data may be collected directly by one of the above mentioned ways. But the collection of data may also be very difficult. In order to get all necessary and available data, the proxy may react dynamically on the answers of the managed device. An example for a dynamic collection rule may be that, depending on the answer of a collection request, another collection request may be initiated.

In various embodiments, the data that may be obtained from the managed device and the meaning of that data may be stored in the manager in a format which may be described in a Management Information Base (MIB). Based on this format, the manager can interpret the information from the managed device. This format may also inform the manager which data can be changed in the managed device.

In some embodiments, the data may be changed in the managed device. In some embodiments, the change may be initiated by sending a corresponding request, which includes an order to set data within the managed device, to a utility. An example for such a request is a change of a parameter, for example, the time, without an operation until the managed device changes its status from operation into idle.

In some embodiments, the managed device may respond with a corresponding response. In an embodiment, this may be, for example, an approval of setting the requested data. This response may also be mapped in a format applicable for the manager.

The process of changing data within the managed device may be initiated by the manager or by the proxy.

In some embodiments, the rules, for example, the collection rules, the translation rules, and the mapping rules, may be adapted for the employed managed system. There may be no need to change anything within the managed system.

In some embodiments, a proxy may provide a manager access to data of an arbitrary managed device by using at least one utility of the managed device. In some embodiments, the proxy may have a sending unit for sending a request for data to a utility of the managed device, a receiving unit for receiving a response from the managed device, and a mapping unit for mapping the information received with the response into a format applicable for the manager. In some embodiments, the proxy may be capable and dedicated to process requests that include at least one order to get data from the managed device, to define requests based on collection rules, and to process responses that include the requested data.

In some embodiments, the proxy may be capable and dedicated to process requests which include at least one order to set data within the managed device and to process a response which includes an approval that the data has been set.

Proxy may have a translation unit for translating at least parts of the response into an intermediate format and the proxy may be preferably capable and dedicated to carry out translations based on translation rules.

In various embodiments, the mapping may be carried out based on mapping rules. The proxy may store the information in a format applicable for the manager. This information may be submitted by the proxy to the manager, in response to a request by the manager.

In some embodiments, a computer system with a processor, an input/output connection and storage may be used. This computer system may also be capable to read a storage medium with a software program including an embodiment.

In various embodiments, a storage medium having a program code for carrying out the method according to an embodiment, and a system having at least one manager and at least one managed device may be included. In some embodiments, at least one manager and at least on managed device may communicate using the method.

BRIEF DESCRIPTION OF THE DRAWINGS

A better understanding of the present invention may be obtained when the following detailed description is considered in conjunction with the following drawings, in which:

FIG. 1 illustrates a system with one manager and several managed devices, according to an embodiment;

FIG. 3 illustrates a request, according to an embodiment;

FIG. 4 illustrates a definition of an intermediate format, according to an embodiment;

FIG. 5 illustrates mapping rules with data type conversion, according to an embodiment;

FIG. 6 illustrates rules generating a message for the manager, according to an embodiment;

FIG. 7 illustrates a combined collecting, translating, and mapping rule, according to an embodiment;

Figure 2:
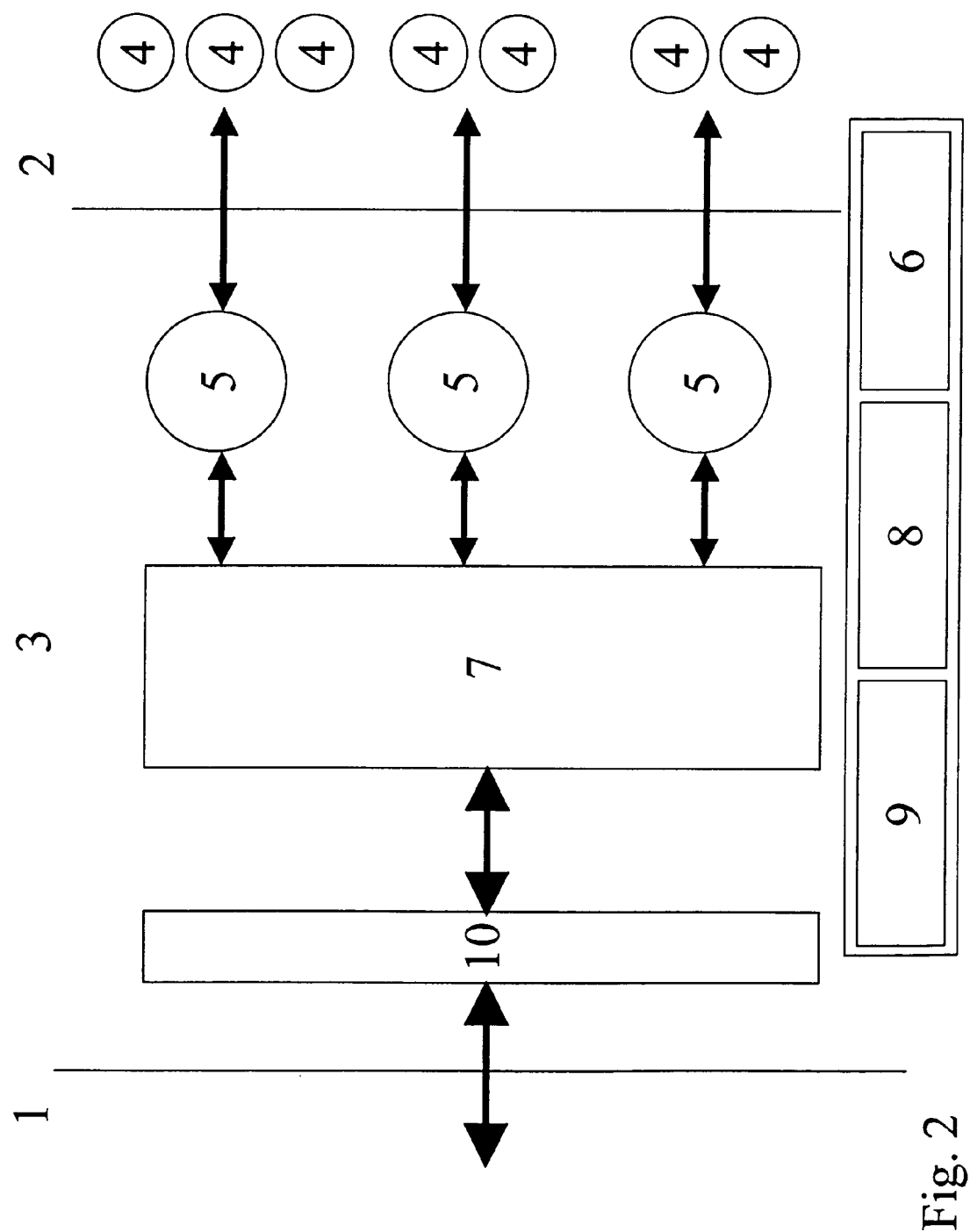
FIG. 2 illustrates a proxy enabling the communication between a manager and a managed device, according to an embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE DRAWINGS

FIG. 1 shows a system according to an embodiment with one manager 1 and several managed devices 2. In order to enable the communication between the manager 1 and the managed devices 2, generic SNMP proxies 3, according to an embodiment, are provided. As shown at the left side of FIG. 1, a generic SNMP proxy may communicate with one managed device 2 or, as shown on the right side of FIG. 1, with two or more managed devices 2.

FIG. 2 shows an embodiment of a proxy 3 enabling the communication between a manager 1 and a managed device 2. For example, the managed device 2 may be a database. This database 2 may have several utilities 4. Examples include a query utility 4 to query and update the data in the database, a maintenance utility 4 to load and to backup data and for migration of data to or from other systems, and an administration utility 4 to create, configure and check the query state and to start or stop the database.

In some embodiments, in order to enable a communication with the managed device 2, the proxy 3 may have at least one sending unit 5 which is able to communicate with at least one utility 4. This sending unit 5 may also be called "driver". In an embodiment, different kinds of drivers 5 may be provided. In an embodiment, one driver 5 may be able to communicate via command-line orders. In an embodiment, driver 5 may be able to communicate via graphical interfaces. In an embodiment, a third driver 5 may be able to communicate via the TCP/IP protocol. These drivers 5 may be used depending on the functionality of the utility 4 to be called.

In various embodiments, these drivers 5 send the requests to at least one utility 4 of the managed device 2. The request may be sent in a format processable by the addressed utility 4. The requests may have different functions. In some embodiments, requests may be for collecting data from the managed device 2.

In order to collect data from the managed device 2, the request may include information that is necessary to answer the request. Therefore, the request may have, for example, information about the addressed utility 4 and the kind of driver 5 to be used. In addition, the request may comprise the name of the function of the utility 4 that has to be started in order to get the requested data. The request may also have parameters for the addressed function in the managed device 2. These parameters may be fixed or may depend on results of previous requests.

In some embodiments, this information may be defined in collection rules 6. These collection rules 6 may have necessary information in order to carry out the desired request. The collection rules 6 may be specific for a certain managed device 2 or refer more generally to a kind of managed device 2.

In various embodiments, the database 2 may have, for example, the utility 'dblist' 4 for retrieving the names of the databases in the system and the utility 'dbcontrol' 4 for controlling a database. In an example, both utilities 4 may be contacted by a command-line driver 5. In order to control the status of each database in the system, a collection rule 6 may have the demand to use the command-line driver 5 to initiate the 'dblist'-utility 4 and to buffer the response. In addition, the collection rule 6 may have the demand to use the command-line driver 5 to initiate the 'dbcontrol'-utility 4 and to submit the necessary parameters. The parameters may be, for example, the buffered names of the databases of the system and the requested action, for example the order 'state', in order to get information about the state of each database. In some embodiments, the response of the order may have the terms running, stopped, or standby or a corresponding value, like 0, 1 or 2.

FIG. 3 illustrates an embodiment of a request to collect all database names. The definitions in lines 1 to 8 are related to the translation and mapping rules linked with this collection rule and are described later on Line 9:

<tabitem>dblistinov31</tabitem<

This example describes the utility to be executed by the collection rule, in this case, a command line utility 'dblistinov31'. With this line the utility may be started. For command line utilities, no further specification may be necessary. This may be different for graphical tools, process attach, or communication monitoring. Line 10:

<tabitem>"object_id=\\aHost\\Tamino\\Databases"</tabitem> defines the parameters to be passed to the utility. With

<tabitem>0</tabitem> in line 11 the type of data provided as answer by the utility is described. In an embodiment, the type of data may be '0'. This may mean the utility is a command-line tool providing a line by line report. This information may be part of the linked translation rule.

In some embodiments, the request may also use context dependant parameters. This can be achieved when line 10 is changed to:

<tabitem>"object_id=\\aHost\\Tamino\\Databases\\{{nth=0}}"</tabitem>.

With this parameter definition, the token with the position '0' from the previous request is used to expand on the fly the parameters list for the actual request. If the previous request has produced, for example, the first token 'db1', the actual request will be defined on the fly by the proxy to use the parameter:

"object_id=\\aHost\\Tamino\\Databases\\db1".

In some embodiments, the collection rules 6 may depend on the entries in a Management Information Base (MIB). Only information that is necessary for the manager 1, is collected based on the collection rules 6. But it is possible, that necessary information cannot be collected directly. Such information can be calculated, for example, based on directly collected information.

In response to the request, the managed device 2 may answer with a corresponding response. The response may be received by receiving units 5 that can also be part of the drivers 5 as shown in FIG. 2. This response may have the requested data or an administrative message, such as an error message. In an embodiment, at least parts of the information in the response may be translated into an intermediate format 7. This translation may be based on translation rules 8. In an embodiment, the intermediate format 7 is an XML-format defined in a DTD. The DTD may have information about the intermediate format 7 and about the table structure of the intermediate format 7. By using an intermediate format 7 the translation process may be substantially simplified.

FIG. 4 shows an embodiment of a DTD for the XML intermediate format. The DTD may describe the data structure of the intermediate format, which may be organized as a table with one or more rows and each row containing one or more columns. The component 'fmtversion' in the DTD may describe the version of the internal format. The component 'ananame' may describe the utility used by the collection rule. The component 'anaversion' may describe the version of this utility. In an embodiment, the table structure may be divided into header information and rows. The header may have columns with each column including a description and additional information. The rows may also be divided in columns.

In an embodiment, the data about the states of the databases in the systems, which may be collected by the described collection rule 6, is translated into the intermediate format 7. For each data line of the response, one row in the table of the intermediate format 7 may be filled. In an embodiment, the response to the above described collection rule 6 may be 'db1 running' in the first row and 'db2stopped' in the second row. In the embodiment, the name of the database may be stored in the first column and the state of the database in the second column.

In various embodiments, the information in the intermediate format 7 may be mapped into a format applicable for the manager. The mapping may be carried out in the example based on mapping rules 9. The mapped information may be stored in an internal storage 10 within the proxy 3. The format of the information in the internal storage is also called object model.

In some embodiments, the format applicable for the manager is SNMP. For SNMP, the object model may be organized in tables and traps. In some embodiments, each table may be identified using a unique object identifier (oid). In some embodiments, each column of the table may have a predefined data type, for example string or integer, and may be identified using a unique object identifier suffix. The full identifier of a value in a table may be a combination of the table oid, the column oid, and the row number.

The mapping rules 9 may also define how often the object model is updated. In addition, in the mapping rules 9, other mapping rules may be defined which may be used with the process in the present mapping rule 9. But the core of the mapping rules 9 may be the description of the mapping process. This description may define how the entries in the intermediate format 7 are extracted and the data type or the data range is converted and assigned in the object model. These steps may be based on an algorithm like boolean or arithmetical operations and decisions based on actual and older information.

In an embodiment, in response to the above described collection and translation, a table may be defined with the two columns 'name' and 'state'. For each row in the intermediate format 7, a corresponding row in the object model may be defined. In an embodiment, the table may get a unique object identifier and the format of the entries of the columns may be defined. In the present example, the entries in the 'name'-columns may have the format string and may be stored as read only. The entries in the 'state'-columns may have the format integer and may also be stored as read only. The entries in this table may be updated every 20 seconds by initiating the corresponding collection 6 and translation rules 8.

FIG. 5 shows an embodiment of mapping rules with data type conversion. Each mapping rule may be described in one column, wherein each column may be defined by one <row> . . . </row> block. The second line of each block may define to which table column the mapping rule belongs. In an embodiment, the table column may be defined with the suffix '4'. The third line may define which kind of conversion should be carried out. The number '0' in line <tabitem>0</tabitem> may define that a conversion from the string format into the integer format is carried out. The value to be converted and the result of the conversion may be defined in the following lines. According to the first mapping rule, the value tamino/dbstdby may be converted to 1. In an embodiment, the second mapping rule may define that the value tamino/dbinact will be converted to 0 and the definition in the third mapping rule may result in the value tamino/dbact is converted into 2.

The information in the manager format obtained by the mapping rules 9 may correspond to the format defined in the Management Information Base (MIB). This information in the manager format may now be transmitted to the manager 1. This transmission may be initiated by the manager 1 or by the proxy 3.

In an embodiment, the manager 1 may collect at regular intervals specific information from the proxy 3. But the proxy 3 may also initiate the transmission of information to the manager 1. This may happen when a certain critical status has been recognized by the proxy 3. This status may be defined in the rules. In response, the proxy 3 may transmit the information on which the critical status has been derived to the manager 1 or a corresponding status message, known in SNMP terms as trap.

FIG. 6 shows an embodiment of rules relating to this information process. In the second line, the object to be evaluated may be defined. The lines three to six may define the algorithm used to decide whether a corresponding message is sent to the manager or not. The N in line three defines that a numerical comparison is carried out. The following line defines that all changes, where the recent value is higher than the previous (in the first mapping rule) or lower than the previous (in the second mapping rule) are observed. If the difference is higher than defined in line six, in this example the integer value 1, a corresponding message may be sent to the manager. In this example, the message includes one additional parameter. This parameter is context dependent as defined in line seven and described above in connection with FIG. 3.

FIG. 7 shows an embodiment of a combination of collection rules, translation rules, and mapping rules for a 'get' request. In this combined rule the line:

<description>Tamino database state table</description> defines that the object model relates to the SNMP table "Tamino data base state table". This table has the object identifier 1.3.6.1.4.1.1028.3.3.1.2.1, which is defined by line:

<table_oid>1.3.6.1.4.1.1028.3.3.1.2.1</table_oid>.

The rule applies to the managed device "Tamino" in the version "3.1.1.4", which is defined by the lines:

<product>Tamino</product>

<version>3.1.1.4</version>.

In addition, the rules may comprise information when the respective request has to be sent. In an embodiment, all rules are carried out successively, and after the last rule, it is started again with the first rule. Each rule may also be assigned to a timer and each time the timer expires, the respective rule may be carried out. Another example is that the rule is only carried out, if a certain criteria is fulfilled.

In an embodiment, it is defined by line:

<update_timeout>45</update_timeout> that the object model is updated every 45 seconds.

According to an embodiment, the object model SNMP table has four columns, wherein each column is defined by one <row> . . . </row> block. Each column includes the definition of the data type in the first line. In the embodiment in FIG. 7, the data types DisplayString and INTEGER are used. In the second line of each column definition, the specific object identifier suffix may be described. In each column, it may also be described by which requests the data can be handled. If the data is defined READONLY, only get requests may collect the data. But if the corresponding definition in the column says READWRITE, get requests, as well as set requests, may act on this data. NOACCESS as shown in line 3 of FIG. 3 may be used to define an inaccessible field in terms of SNMP, corresponding to the MIB definition of the table.

In the present example, a table index is built. The fourth line defines simply by the words YES or NO whether this data should be part of the index or not. In lines five to eight, the address of the value to be mapped from the intermediate format into the object model may be defined. This definition may be made by the absolute position, based on the number of the row and the number of the column. Another possibility is to use the identification of the row and of the column in the respective header. As identification of the row, the name using the index as name identifier may be employed. Another possibility may be to use a XML navigation path, like an XPath compatible description. In an embodiment, the address is defined, for example, by the lines:

<tabitem>-1</tabitem>

<tabitem></tabitem>

<tabitem>1</tabitem>

<tabitem></tabitem> which are used to navigate through the XML tree. The other lines of the column definition may have already been described in connection with the description of FIG. 3. The processing of the XML intermediate format may be implemented by using actual processing technology.

In an embodiment, the manager 1 may be enabled to not only receive information from the managed device 2, but also to submit information to the managed device 2, when the corresponding data is defined as READWRITE as described above. In order to change information within the managed device 2, the manager 1 may submit a corresponding request to the proxy 3 and the proxy 3 may initiate the corresponding rules to carry out the requested change by using at least one utility 4 of the managed device 2.

Figure 8:
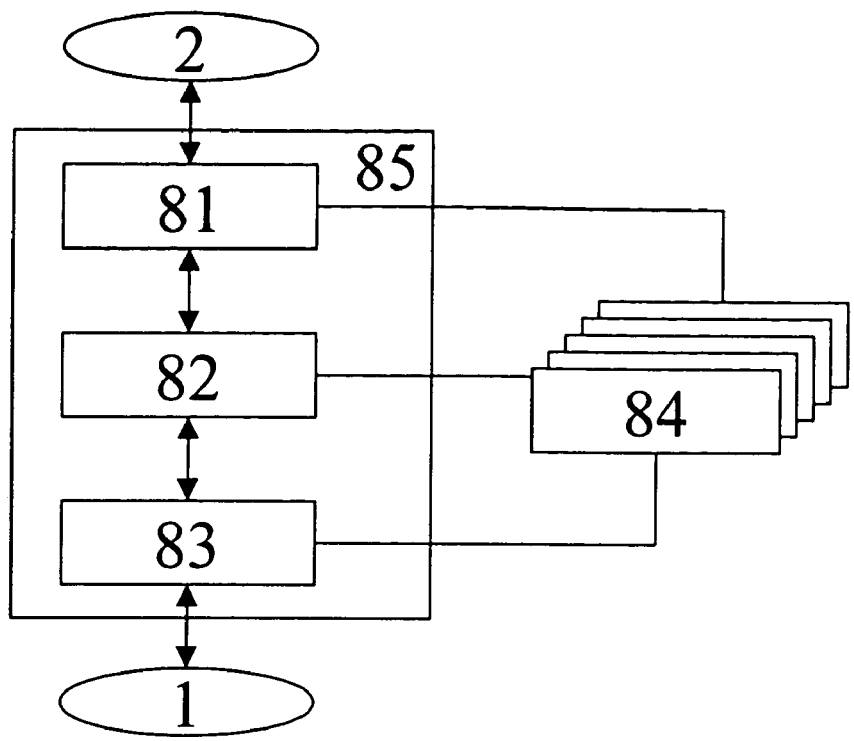
FIG. 8 illustrates an apparatus for carrying out an embodiment.

An embodiment of an apparatus carrying out the embodiment is illustrated in FIG. 8. The apparatus may have three engines: the data collection engine 81, the rendering and data analysis engine 82, and the SNMP protocol engine 83. These three engines may be used to enable the communication between the manager 1 and the managed device 2.

As shown by the arrows in FIG. 8, the data collection engine 81 may communicate with the managed device 2 and the rendering and data analysis engine 82. The communication may be bi-directional. In addition, the data collection engine 81 may communicate with a data storage 84. In this data storage 84, all necessary rules may be stored. The data collection engine 81 may communicate with this storage 84 in order to retrieve the necessary rules (for example, the collection rules).

The rendering and data analysis engine 82 may communicate with the data collection engine 81, as mentioned above, and the SNMP protocol engine 83. This communication may also be bi-directional communication. The rendering and data analysis engine 82 may communicate also with the data storage 84 in order to retrieve the necessary rules, the translation rules.

In some embodiments, the SNMP protocol engine 83 may communicate with the rendering and data analysis engine 82, as mentioned above, and with the manager 1. In an embodiment, the communication between the SNMP protocol engine 83 and the manager 1 may use SNMP. The communication of the SNMP protocol engine 83 may also be bi-directional communication. The SNMP protocol engine may retrieve the necessary mapping rules via a suitable connection from the data storage 84.

The data collection engine 81, the rendering and data analysis engine 82, and the SNMP protocol engine 83 may be part of one unit 85. This unit 85 may be called proxy. For example, the unit may be called SNMP proxy in this case.

Figure 9:
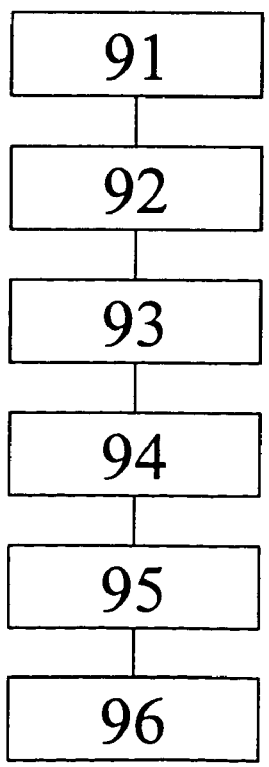
FIG. 9 illustrates a process for generating a SNMP proxy for a specific managed device, according to an embodiment.

FIG. 9 describes an embodiment of a process for generating a proxy for a specific managed device 2. For this generation, processing the Management Information Base of the managed device 2 may be necessary. In a first step 91, this Management Information Base may be created depending on the utilities provided by the managed device and the needs on the manager side. In a second step 92, a corresponding intermediate format may be defined. After the definition of the intermediate format, the collection rules may be created 93. Based on the expected response of the collection requests, the translating rules for translating the information of the response into the intermediate format 94 may be generated. In step 95 an object model may be created based on the Management Information Base which has been created in step 91. In a final step 96, mapping rules for carrying out the mapping from the intermediate format into the object model may be defined. In these mapping rules, critical states may be defined. In an embodiment it may also be defined how the corresponding status messages are generated. In addition, the conversion of the information in the response may be defined in the mapping rules, if this is necessary.

Therefore, an embodiment enables the communication between a manager and an arbitrary managed device the first time, without changing anything within the managed device.

Various embodiments may further include receiving or storing instructions and/or information implemented in accordance with the foregoing description upon a carrier medium. Suitable carrier media may include storage media or memory media such as magnetic or optical media, e.g., disk or CD-ROM, random access memory, or other memory, as well as transmission media or signals such as electrical, electromagnetic, or digital signals, conveyed via a communication medium such as a network and/or a wireless link.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A computer-implemented method for providing a manager access to a managed device, comprising:
   sending a request to a utility of the managed device using a driver for communicating with the utility;
   receiving a response from the managed device, wherein the response includes information required to manage the managed device;
   translating at least parts of the response into an intermediate XML-format;
   mapping at least some of the information from the intermediate XML-format into management information in an SNMP-format;
   storing the mapped management information in the SNMP-format; and
   in response to receiving a request by the manager, outputting the mapped management information to the manager.

2. The method of claim 1, wherein the request is defined by collection rules specific to the managed device.

3. The method of claim 1, further comprising:
   updating the collection rules in response to a desired change in the access to the managed device, wherein the change is reflected in the updated collection rules.

4. The method of claim 1, wherein the translation is defined by translation rules, wherein the translation rules include a document type definition (DTD) that describes the data structure of the XML-format.

5. The method of claim 4, further comprising:
   updating the translation rules in response to a desired change in the access to the managed device, wherein the change is reflected in the updated translation rules.

6. The method of claim 1, wherein the mapping is defined in mapping rules, wherein the mapping rules correspond to a format defined in the Management Information Base (MIB) retained by a manager of the managed device.

7. The method of claim 6, further comprising:
   updating the mapping rules in response to a desired change in the access to the managed device, wherein the change is reflected in the updated mapping rules.

8. The method of claim 7, wherein the managed device is not altered.

9. The method of claim 1, wherein said request comprises an order to set data within said managed device.

10. The method of claim 1, wherein said request comprises an order to get data from the managed device.

11. A computer accessible memory medium comprising program instructions for providing a manager access to a managed device, wherein the program instructions are executable by a processor to:
    send a request to a utility of the managed device using a driver for communicating with the utility;
    receive a response from the managed device, wherein the response includes information required to manage the managed device;
    translate at least parts of the response into an intermediate XML-format;
    map at least some of the information from the intermediate XML-format into management information in an SNMP-format;
    store the mapped management information in the SNMP-format; and
    in response to receiving a request by the manager, output the mapped management information to the manager.

12. The memory medium of claim 11, wherein the request is defined by collection rules specific to the managed device.

13. The memory medium of claim 11, wherein the program instructions are further executable to:
    update the collection rules in response to a desired change in the access to the managed device, wherein the change is reflected in the updated collection rules.

14. The memory medium of claim 11, wherein the translation is defined by translation rules, wherein the translation rules include a document type definition (DTD) that describes the data structure of the XML-format.

15. The memory medium of claim 14, wherein the program instructions are further executable to:
    update the translation rules in response to a desired change in the access to the managed device, wherein the change is reflected in the updated translation rules.

16. The memory medium of claim 11, wherein the mapping is defined in mapping rules, wherein the mapping rules correspond to a format defined in the Management Information Base (MIB) retained by a manager of the managed device.

17. The memory medium of claim 16, wherein the program instructions are further executable to:
    updating the mapping rules in response to a desired change in the access to the managed device, wherein the change is reflected in the updated mapping rules.

18. The memory medium of claim 16, wherein the managed device is not altered.

19. The memory medium of claim 11, wherein said request comprises an order to set data within said managed device.

20. The memory medium of claim 11, wherein said request comprises an order to get data from the managed device.

21. A system for providing a manager access to a managed device, comprising:
    a managed device;
    a processor coupled to the managed device; and
    a memory medium coupled to the processor, wherein the program instructions are executable by the processor to:
        send a request to a utility of the managed device using a driver for communicating with the utility
        receive a response from the managed device, wherein the response includes information required to manage the managed device;
        translate at least parts of the response into an intermediate XML-format;
        map at least some of the information from the intermediate XML-format into management information in an SNMP-format;
        store the mapped management information in the SNMP-format; and
        in response to receiving a request by the manager, output the mapped management information to the manager.

* * * * *